Dec. 1, 1925.  
S. BROWN  
CHLORINATION APPARATUS  
Filed Jan. 13, 1921   3 Sheets-Sheet 1
1,564,044
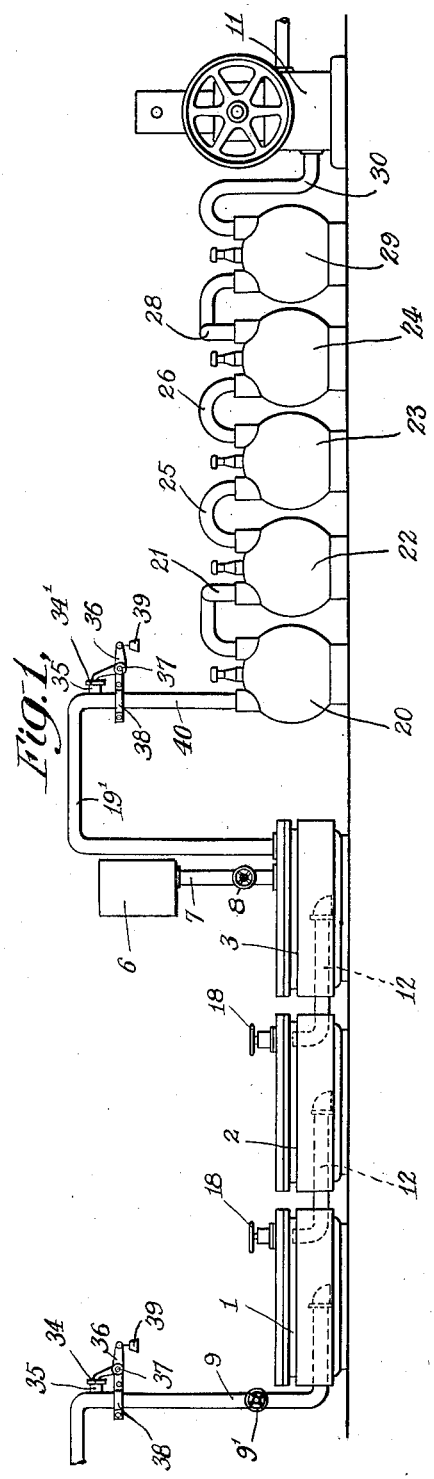
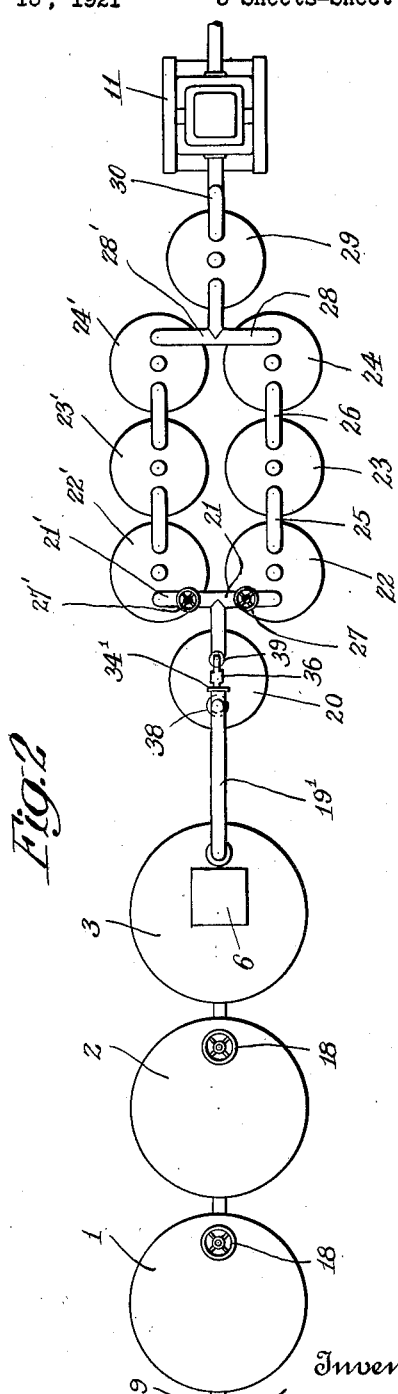
Inventor
Sandford Brown
By his Attorney
J. T. Edmonds

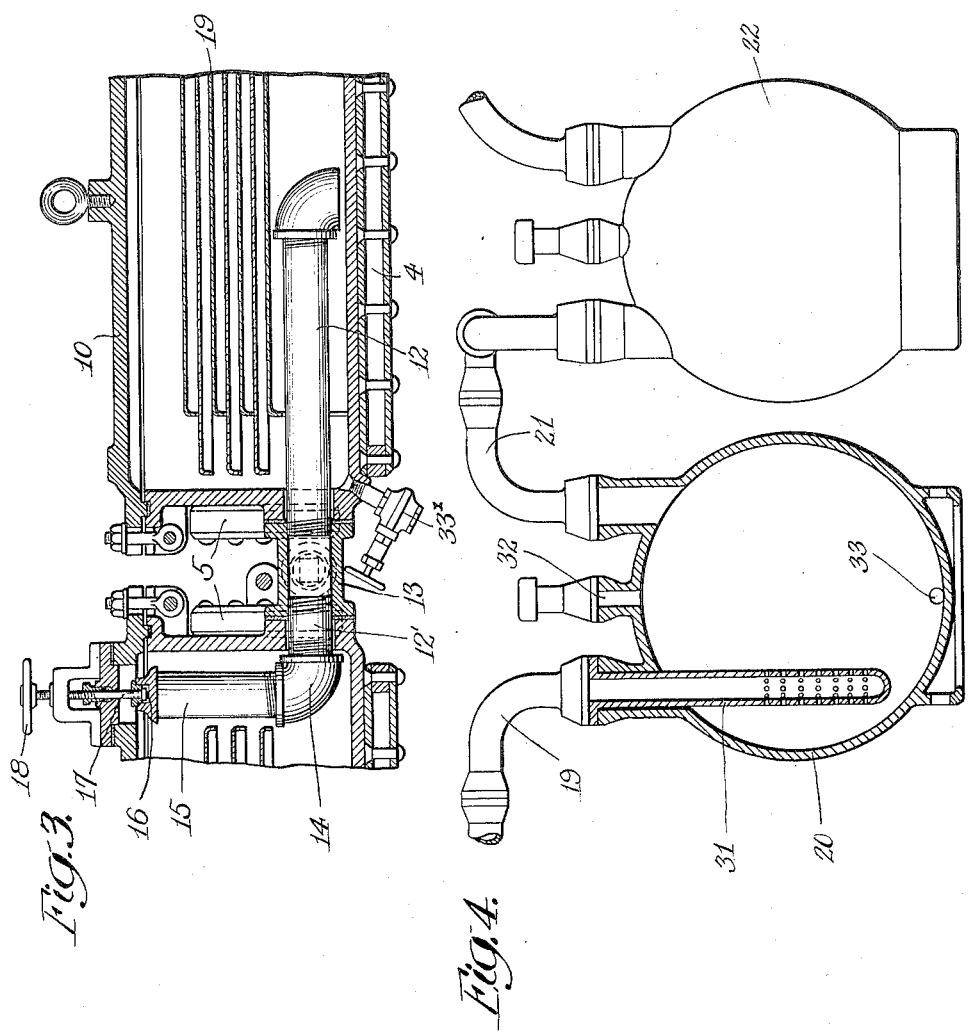

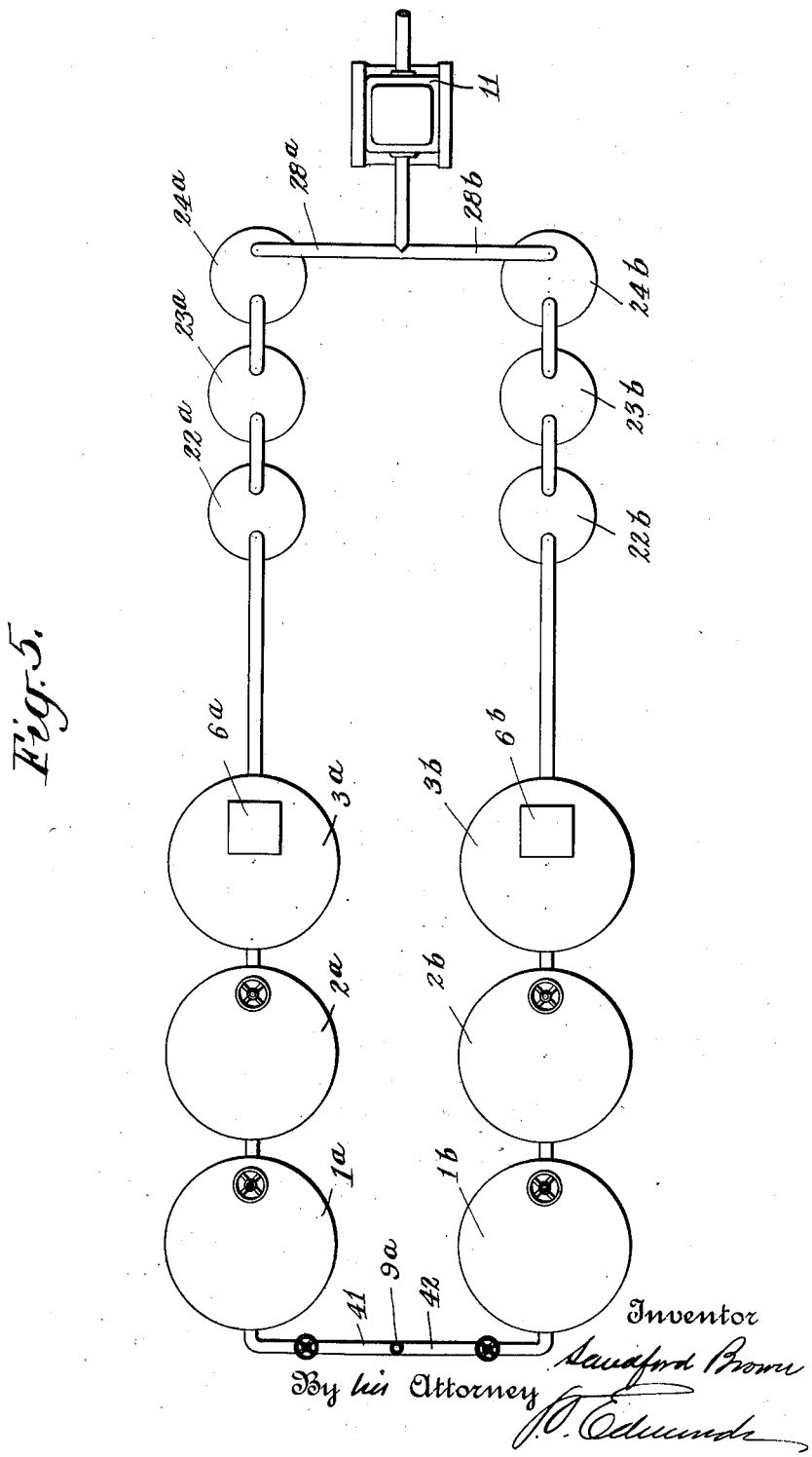

Patented Dec. 1, 1925.

1,564,044

UNITED STATES PATENT OFFICE.

SANDFORD BROWN, OF NEWARK, NEW JERSEY, ASSIGNOR, BY MESNE ASSIGNMENTS, TO HALOWAX CORPORATION, OF NEW YORK, N. Y., A CORPORATION OF NEW YORK.

CHLORINATION APPARATUS.

Application filed January 13, 1921. Serial No. 437,010.

*To all whom it may concern:*

Be it known that I, SANDFORD BROWN, a citizen of the United States, residing at Newark, in the county of Essex and State of New Jersey, have invented certain new and useful Improvements in Chlorination Apparatus, of which the following is a specification.

My invention relates to a process for chlorinating organic aromatic hydrocarbon materials, particularly naphthalene, and recovering hydrochloric acid evolved during the chlorination process. My invention also relates to improved apparatus which may be used in carrying out the process referred to.

Naphthaline may be chlorinated by maintaining bodies of the same in molten condition in a series of pots or chlorinating vessels through which chlorine gas is successively passed. In all the prior practices with which I am familiar it has been deemed necessary, or highly advantageous, to maintain the naphthalene or organic material which is to be chlorinated, under pressure, and to force the chlorine gas through the material. It has been stated that the rapidity of absorption of the chlorine by naphthalene or other hydro-carbon will be increased when the temperature and pressure are raised above 212° F. and atmospheric pressure respectively.

I have found on the contrary that the chlorination proceeds as effectively when a partial vacuum is maintained in the chlorinating chamber, that is, a pressure less than atmospheric, the chlorine gas being drawn through the chlorinating chambers by suction instead of being forced through the same, the chlorinating chambers being heated in the usual way, as by means of steam jackets.

An important advantage of this procedure is that there can be no leakage from the chlorinating apparatus into the atmosphere surrounding the same. In the previous practice, in which pressures up to fifty pounds per square inch were used in the chlorinating vessels, leakage from the system was frequent and this was highly dangerous and costly as both chlorine and hydrochloric acid (which is produced in the course of the process) escape and affect the workmen and surrounding property; this is particularly true of the hydrochloric acid gas which combining with the moisture of the atmosphere to form hydrochloric acid solution is very destructive of apparatus, piping, roofing, etc. Accordingly, it was customary to carry out the reaction out of doors. With my present method there can be no leakage outward from either the chlorinating vessel or the hydrochloric recovery vessels; the latter are usually located outdoors because of leakage; in fact, a usual part of the system is a large and costly tower ventilated to the open air.

It is essential that the chlorinating vessels be installed inside of the building for efficient and convenient operation, to prevent radiation losses and to permit easy handling of the product, and it is very advantageous also for it to be possible to operate the hydrochloric vessels within the building, thus preventing damage by freezing. My system makes the operation of both the chlorinating and acid vessels indoors quite practical, as the leaks are always of air into the system and not of deleterious gases out of the system, and these leaks may be readily detected by hissing sounds at the point of leakage or by the pressure difference on the gauges.

When leaks arise in the chlorinating vessels, as ordinarily operated, the operation must be stopped immediately until repairs are made, whereas in my system, the leaks may be detected and easily repaired without stopping the operation.

A further and important advantage of the suction and vacuum method referred to relates to the method of acid absorption which may be utilized. In the prior practice, chlorine gas being positively pumped through the chlorinating vessels, the hydrochloric acid gas evolved was progressed under slight pressure through a series of absorbing vessels containing water, known as tourills containing water, and the usual absorption towers. With this system the hydrochloric acid gas was passed over the surface of the water in the tourills and was absorbed thereby. The passage of gas through the absorption system was apparently induced to a large extent by the affinity which the water has for the gas. When stoneware apparatus is used in hydrochloric acid recovery it is impracticable to make use of sufficient pressure to force the acid gas through the whole absorbing system, the positive pressure in the absorption system of the prior installations being actually very slight. When, however, for any reason contact between the gas and the surface of the water was interrupted, as by the appearance of a film of oil on the surface of the water, the flow of the gas through the system was impeded and the absorption of the gas by the water decreased.

In order to obtain maximum absorption, a large number of absorbers is necessary. The area of the aqueous absorbing surface for each unit of volume of gas passing over it, must be very large, necessitating a large volume of liquid.

This difficulty is overcome by my method whereby the entire system is maintained under a partial vacuum, the chlorine gas being sucked through the chlorinating vessels and the hydrochloric acid gas being sucked through the absorption system, in a continuous process. Because of this modification of the process, it is possible to introduce hydrochloric acid gas near the bottom of each tourill and have the same bubble up through the entire body of water in each tourill, the suction being sufficient to permit the use of this method. Because of this procedure the acid is absorbed much more effectively and economically than in the previous method, the number of tourills required being only a small fraction of the number required in the previous system, and no large absorbing towers being required. There is accordingly a considerable saving of floor space and expense for plant, with added efficiency absorption, greater safety and other desirable features. In my system, all the gas comes into positive contact with the absorbing medium, the velocity of the gas may be relatively high and the volume of water per unit of volume of gas may be relatively small.

It is also advantageous in many cases to operate several chlorinating and acid recovery systems in parallel as will be more fully explained hereinafter.

The objects of my invention relate to an improved process in accordance with the foregoing, and suitable apparatus by which the process may be carried out.

In order that my invention may be more clearly understood, attention is hereby directed to the accompanying drawings forming part of this application and illustrating one manner of practicing my improved process, and one form of apparatus in which the same may be carried out. In the drawings Fig. 1 represents diagrammatically a side elevation of apparatus comprising a chlorinating and acid absorbing installation; Fig. 2 is a diagrammatic top plan view of the same; Fig. 3 is an enlarged vertical section taken through the adjacent portions of a pair of chlorinating pots; Fig. 4 is a view partly in side elevation and partly in vertical section of a pair of adjacent tourills or acid absorbing vessels and Fig. 5 is a diagrammatic top plan view of a modified form of apparatus, embodying parallel chlorinating and acid recovery systems.

Referring to the drawings I have illustrated a series of three chlorinating pots 1, 2 and 3, it being understood that any desired number may be used. These pots are represented as being similar to those described in Patent 1,294,230 granted to Kirk Brown February 11, 1919.

These pots are suitably heated preferably by steam jacketing the same on the bottoms and about their sides as is indicated at 4 and 5. Naphthalene or other material to be chlorinated is led into the system, preferably from one end until the same extends in fluid condition at a desired level in all the pots, after which chlorine gas may be introduced into the system, at the other end. In the drawings I have diagrammatically indicated a tank 6 from which naphthalene flows through a pipe 7 provided with a valve 8 into the pot 3. At the opposite end of the series of chlorinating vessels I have indicated a pipe 9, provided with a shut-off valve 9', through which chlorine may be introduced below the surface of the naphthalene in pot 1. These pots are kept closed during the chlorinating operation and may be provided with covers 10 secured in any desired manner.

The chlorine gas is drawn through the system by means of a pump indicated at 11. The connection between each pair of chlorinating pots such as 1, 2 and 3 is preferably made in the manner described in Patent 1,294,230 referred to, my invention, however, not being limited to such an arrangement. As shown a pipe 12 is provided in each pot. As is shown in Fig. 3, each pipe 12 is connected by a coupling 13 with a corresponding pipe section 12' in the adjacent pot, section 12' being connected by an elbow 14 with a vertical pipe 15 provided with a valve seat at its upper end, above the normal level of the naphthalene. A valve is provided having a part 16 to coact with this valve seat and to control the opening in the top of the pipe 15. This valve is operated from the exterior of the pot, as by means of valve stem 17 operated by a hand wheel 18.

The pots are provided with a series of superposed pans 19 as is usual in a chlorinating apparatus. The chlorine gas which enters pot 1 through pipe 9 is drawn by the suction of pump 11 through the naphthalene in pot 1, some of the chlorine gas, together with hydrochloric acid gas, which is evolved in the chlorination of the naphthalene passing through the valve and pipe connections to pot 2, and some of the chlorine gas and a greater quantity of hydrochloric acid gas passing through the valve and pipe connections in pot 2 into pot 3. When the material in pot 1 has been chlorinated to a desired stage the supply of chlorine gas passing through pipe 9 may be stopped, the valve in pot 1 closed and the chlorinated product removed from pot 1, after which the partially chlorinated product in pots 2 and 3 may be blown over or otherwise transferred to pots 1 and 2, and pot 3 refilled with naphthalene to be chlorinated, after which the operation may be repeated.

Hydrochloric acid gas evolved in the chlorination passes from pot 3 through a series of tourills, at the end of which the pump 11 is connected. In the construction shown the hydrochloric acid gas passes from pot 3 through a pipe connection 19' to a tourill 20. From this point the acid gas which has not been absorbed within the water in tourill 20 may pass through pipe connection 21 to a tourill 22 and thence through tourills 23 and 24 which are connected in series by connections 25 and 26. Or, the gas may pass through connection 21' to a tourill 22' and thence through tourills 23' and 24' which are similarly connected in series. Pipe connections 21 and 21' are provided with suitable valves 27, 27' so that one series or the other of tourills, or both series in parallel, may be utilized. From the last tourill of either series 24 or 24', any acid gas which has not been absorbed will pass through connection 28 or 28' to a tourill 29 which is connected by connection 30 to the pump.

The acid absorbing vessels are preferably stoneware tourills as shown which are filled to a suitable level with water. The gas entering any one of the same, such as the tourill 20, passes downwardly therein through a perforated pipe 31 from which the gas passes within the water and bubbles up through the same, a part of the gas being absorbed. Any gas which passes over will pass in like manner through the various tourills of the series until the same is all absorbed. When the acid solution is to be removed from one series of tourills such as 22, 23 and 24, valve 27 may be closed and valve 27' opened so that the gas will then pass through the other series. The tourills are kept closed during the operation of the system and may be provided with valved openings 32 through which the same may be filled with fresh water when required, the acid solution being drawn off at the bottom through openings 33. The chlorinated material may be drawn off or removed from any of the pots 1, 2 or 3 in any desired manner as by drawing the same off through connection 33'.

The last tourill 29 which is directly connected with the pump may be used as an indicator. In the normal operation of the system no gas should come over into this tourill, but all of the same should be absorbed within the preceding tourills.

It will be seen that in the operation of the system the pump 11 exerts a continuous suction upon all of the chlorinating pots and the acid absorbing vessels which are connected therewith in series and produces a partial vacuum in all of the same.

At various points of the gas passage throughout the system safety valves should be located to prevent the liquids from backing over into the preceding vessels in the event of stoppage of the pump or a serious break in the vacuum. These safety valves are so designed that the vacuum will be released on the inlet to the vessels before the liquids can back up through the outlet. This effect is obtained by bringing the liquids to a state of hydrostatic balance.

A safety valve is indicated in Fig. 1 in the inlet pipe 9, in which plate 34 covers outlet 35 of the pipe, plate 34 being mounted on a bell-crank 36 pivoted at 37 to the strap 38. A counterweight 39 is carried by the horizontal arm of bell-crank 36. A similar valve is located between the acid recovery and chlorinating units on the downwardly extending portion 40 of connection 19', the plate 34' being mounted in the same manner as plate 34 described above. If a break in the line occurs at any point between valve 9' and pump 11 the safety valves will open, thus preventing the liquids in the system from backing over into the preceding vessels.

An arrangement of both chlorinating and acid absorbing vessels in parallel trains is indicated in Fig. 5, in which entrance pipe 9ª for the chlorine connects through pipe 41 to a train of chlorinating vessels 1ª, 2ª, 3ª, or through pipe 42 to chlorinating vessels 1ᵇ, 2ᵇ and 3ᵇ, these being similar in all respects to the vessels 1, 2, 3, and their connections, previously described. Connection may be made for the acid gas to pass from vessel 3ª to the tourills 22ª, 23ª and 24ª, and from vessel 3ᵇ to tourills 22ᵇ, 23ᵇ and 24ᵇ, connection being made from vessels 24ª and 24ᵇ respectively through pipes 28ª and 28ᵇ to the pump 11.

Since the resistance offered to the passage of the gas through the system varies directly as the sum of the hydrostatic heads of the liquid in the various vessels, it is obvious that any number of chlorinating and absorbing units may be operated in parallel simultaneously by one pump without increasing the resistance. When operating in parallel, the flow of gas through the various units will adjust itself automatically and progressively, thereby equalizing and reducing the rate of temperature rise throughout the entire system. The reason the flow of gas will adjust itself automatically, is that it will flow first through the train of units in which there is the least resistance. As the chlorination proceeds, the liquids will increase in specific gravity and consequently in hydrostatic resistance, and then the gas will flow through the other train of units in parallel; thus the two trains of units in parallel will be balancing each other.

By operating several systems in parallel, the production process is greatly facilitated, for when the contents of any one unit have reached the desired degree of concentration, the unit may be cut out of the system, the contents withdrawn, and the unit recharged without stopping the operation of the balance of the system.

In regard to the system generally, it may be noted that the pumps available for forcing chlorine gas under positive pressure are very unsatisfactory, it being necessary even with the best of them, to replace the packing frequently due to the corrosion from the gas and sulphuric acid which is used in conjunction with them.

In my system, the pump suffers no abnormal depreciation, since it merely maintains a static balance at the end of the system, there being no gas passed through it whatever.

By permitting the first absorption vessels or vessel, such as 20, of the acid system to remain in a completely concentrated state, and using it as a washer, a particularly fine form of acid may be procured in the balance of the absorption system.

What I claim is:

1. In chlorine-utilizing apparatus, the combination of a plurality of series of normally closed vessels adapted for the chlorination of naphthalene, in parallel, means for introducing therein material to be chlorinated in liquid form, means for connecting at will the first vessel of either series, or of both series, to a chlorine gas container, and a suction pump connected to the last vessel of each series.

2. In chlorine-utilizing apparatus, the combination of a plurality of trains of normally closed chlorinating vessels, said trains being connected in parallel and the units of each train being connected together in series, means for introducing therein material to be chlorinated in liquid form, means for connecting at will the first vessel of either train or of both trains to a chlorine gas container, a plurality, equal to said first named plurality, of trains of tourills containing water, each train of tourills being connected in series with one of said trains of chlorinating vessels, a suction pump and connections between said pump and the last tourill of each train.

This specification signed this 7th day of January, 1921.

SANDFORD BROWN.